(12) United States Patent
Iwamoto et al.

(10) Patent No.: US 12,181,875 B2
(45) Date of Patent: Dec. 31, 2024

(54) CONTROL SYSTEM, CONTROL METHOD, AND PROGRAM

(71) Applicant: TOYOTA JIDOSHA KABUSHIKI KAISHA, Toyota (JP)

(72) Inventors: Kunihiro Iwamoto, Toyota (JP); Yuta Itozawa, Nagoya (JP); Hirotaka Komura, Setagaya-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 17/983,438

(22) Filed: Nov. 9, 2022

(65) Prior Publication Data
US 2023/0152804 A1 May 18, 2023

(30) Foreign Application Priority Data
Nov. 15, 2021 (JP) ................ 2021-185428

(51) Int. Cl.
| B66F 9/00 | (2006.01) |
| B65G 1/10 | (2006.01) |
| B66F 9/06 | (2006.01) |
| B66F 9/075 | (2006.01) |
| G05D 1/00 | (2006.01) |

(52) U.S. Cl.
CPC ............ *G05D 1/0088* (2013.01); *B65G 1/10* (2013.01); *B66F 9/063* (2013.01); *B66F 9/0755* (2013.01)

(58) Field of Classification Search
None
See application file for complete search history.

(56) References Cited

U.S. PATENT DOCUMENTS

| 10,894,664 | B1 * | 1/2021 | Brady ................. G05D 1/0088 |
| 2019/0202388 | A1 * | 7/2019 | Sonoura ................. G06Q 10/08 |
| 2020/0130510 | A1 * | 4/2020 | Eck ........................ B60L 53/14 |
| 2021/0194388 | A1 | 6/2021 | Iwamoto et al. |
| 2022/0144609 | A1 * | 5/2022 | Yamamoto ............. G05D 1/667 |
| 2022/0185585 | A1 * | 6/2022 | Toebes .................... B25J 5/007 |
| 2022/0404495 | A1 * | 12/2022 | Mori ..................... G06V 10/757 |
| 2024/0066691 | A1 * | 2/2024 | Kamikawa ........... B25J 15/0616 |

FOREIGN PATENT DOCUMENTS

JP 2021-099724 A 7/2021

* cited by examiner

*Primary Examiner* — James M McPherson
(74) *Attorney, Agent, or Firm* — Dinsmore & Shohl LLP

(57) ABSTRACT

A control system for controlling a movement of a carriage in which a load is housed includes a determination unit configured to determine whether or not an autonomous mobile robot is planned to move toward the carriage in a state in which the load is raised to a predetermined height or higher by a placement part, the autonomous mobile robot including the placement part having a changeable height and being configured to house the load placed on the placement part in the carriage, and a carriage control unit configured to control the carriage so that the carriage moves toward the autonomous mobile robot when it is determined that the autonomous mobile robot is planned to move toward the carriage in a state in which the load is raised to the predetermined height or higher by the placement part.

8 Claims, 13 Drawing Sheets

CONTROL SYSTEM, CONTROL METHOD, AND PROGRAM

CROSS REFERENCE TO RELATED APPLICATIONS

This application is based upon and claims the benefit of priority from Japanese patent application No. 2021-185428, filed on Nov. 15, 2021, the disclosure of which is incorporated herein in its entirety by reference.

BACKGROUND

The present disclosure relates to a control system, a control method, and a program.

In recent years, techniques have been developed for transporting objects by autonomous mobile robots in factories, warehouses, or the like. For example, Japanese Unexamined Patent Application Publication No. 2021-099724 discloses an autonomous mobile robot having a placement part on which a load is placed. The autonomous mobile robot can then transport a load by moving in a state in which the load is placed on the placement part. A height of the placement part in the autonomous mobile robot can be changed.

SUMMARY

The posture of the autonomous mobile robot is less stable when the load is placed on the raised placement part than when it is not. Therefore, when the autonomous mobile robot moves in a state in which the load is placed on the raised placement part, there is a risk caused by the instability of the posture of the autonomous mobile robot, for example, falling.

The present disclosure has been made in view of the above circumstances, and an object of the present disclosure is to provide a control system, a control method, and a program capable of reducing a risk due to lowering of the level of stability of a posture of an autonomous mobile robot having a placement part with a changeable height.

In an example aspect of the present disclosure in order to achieve the above object, a control system for controlling a movement of a carriage in which a load is housed includes: a determination unit configured to determine whether or not an autonomous mobile robot is planned to move toward the carriage in a state in which the load is raised to a predetermined height or higher by a placement part, the autonomous mobile robot including the placement part having a changeable height and being configured to house the load placed on the placement part in the carriage; and a carriage control unit configured to control the carriage so that the carriage moves toward the autonomous mobile robot when it is determined that the autonomous mobile robot is planned to move toward the carriage in a state in which the load is raised to the predetermined height or higher by the placement part.

Such control system reduces a distance that the autonomous mobile robot moves toward the carriage, because the carriage moves toward the autonomous mobile robot. Therefore, it is possible to reduce the distance that the autonomous mobile robot moves in a state where the load is placed on the raised placement part, that is, in an unstable state. It is thus possible to reduce the risk due to the lowering of the level of the stability of the posture of the autonomous mobile robot.

In the above example aspect, the determination unit may be configured to make the determination based on information indicating a height of the placement part detected by using a sensor or a height of the load above the placement part detected by using the sensor.

With such a configuration, a determination about whether or not the autonomous mobile robot is planned to move toward the carriage in a state in which the load is raised to the predetermined height or higher by the placement part can be easily made.

In the above example aspect, the determination unit may be configured to make the determination based on control information about the height of the placement part received from the autonomous mobile robot.

With such a configuration, a determination about whether or not the autonomous mobile robot is planned to move toward the carriage in a state in which the load is raised to the predetermined height or higher by the placement part can be easily made.

In the above example aspect, the determination unit may be configured to make the determination based on a planned housing position of the load in the carriage.

With such a configuration, regardless of whether or not the placement part has already been raised, a determination about whether or not the autonomous mobile robot is planned to move toward the carriage in a state in which the load is raised to the predetermined height or higher by the placement part can be easily made.

In the above example aspect, the load may include projections projecting in a horizontal direction on both sides of the load, the carriage may include an open chassis, the chassis may include therein a support part for supporting the projections, and the carriage control unit may be configured to move the carriage so that the placement part enters the chassis.

Such configuration enables the load to be housed in the carriage by the movement of the carriage, not by the movement of the autonomous mobile robot. Therefore, the risk due to the movement of the autonomous mobile robot for housing the load in the carriage can be reduced.

In another example aspect of the present disclosure in order to achieve the above object, a method for controlling a movement of a carriage in which a load is housed includes: determining whether or not an autonomous mobile robot is planned to move toward the carriage in a state in which the load is raised to a predetermined height or higher by a placement part, the autonomous mobile robot including the placement part having a changeable height and being configured to house the load placed on the placement part in the carriage; and controlling the carriage so that the carriage moves toward the autonomous mobile robot when it is determined that the autonomous mobile robot is planned to move toward the carriage in a state in which the load is raised to the predetermined height or higher by the placement part.

Such method reduces a distance that the autonomous mobile robot moves toward the carriage, because the carriage moves toward the autonomous mobile robot. Therefore, it is possible to reduce the distance that the autonomous mobile robot moves in a state where the load is placed on the raised placement part, that is, in an unstable state. It is thus possible to reduce the risk due to the lowering of the level of the stability of the posture of the autonomous mobile robot.

In another example aspect of the present disclosure to achieve the above object, a program for causing a computer for controlling a movement of a carriage in which a load is housed to execute: determining whether or not an autonomous mobile robot is planned to move toward the carriage in a state in which the load is raised to a predetermined height or higher by a placement part, the autonomous mobile robot including the placement part having a changeable height and being configured to house the load placed on the placement part in the carriage; and controlling the carriage so that the carriage moves toward the autonomous mobile robot when it is determined that the autonomous mobile robot is planned to move toward the carriage in a state in which the load is raised to the predetermined height or higher by the placement part.

Such program reduces a distance that the autonomous mobile robot moves toward the carriage, because the carriage moves toward the autonomous mobile robot. Therefore, it is possible to reduce the distance that the autonomous mobile robot moves in a state where the load is placed on the raised placement part, that is, in an unstable state. It is thus possible to reduce the risk due to the lowering of the level of the stability of the posture of the autonomous mobile robot.

According to the present disclosure, it is possible to provide a control system, a control method, and a program capable of reducing a risk due to lowering of the level of stability of a posture of an autonomous mobile robot having a placement part which can change its height.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments of the present disclosure will now be described with reference to the drawings.

First Embodiment

A transport system according to a first embodiment will be described. This transport system includes an autonomous mobile robot 10 and a carriage 20. The transport system may include a plurality of autonomous mobile robots 10 or a plurality of carriages 20.

Figure 1:
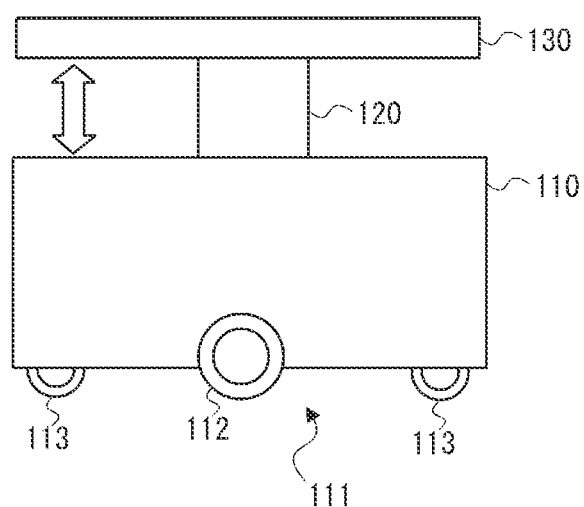
FIG. 1 is a schematic side view showing an example of an autonomous mobile robot according to a first embodiment.
Figure 2:
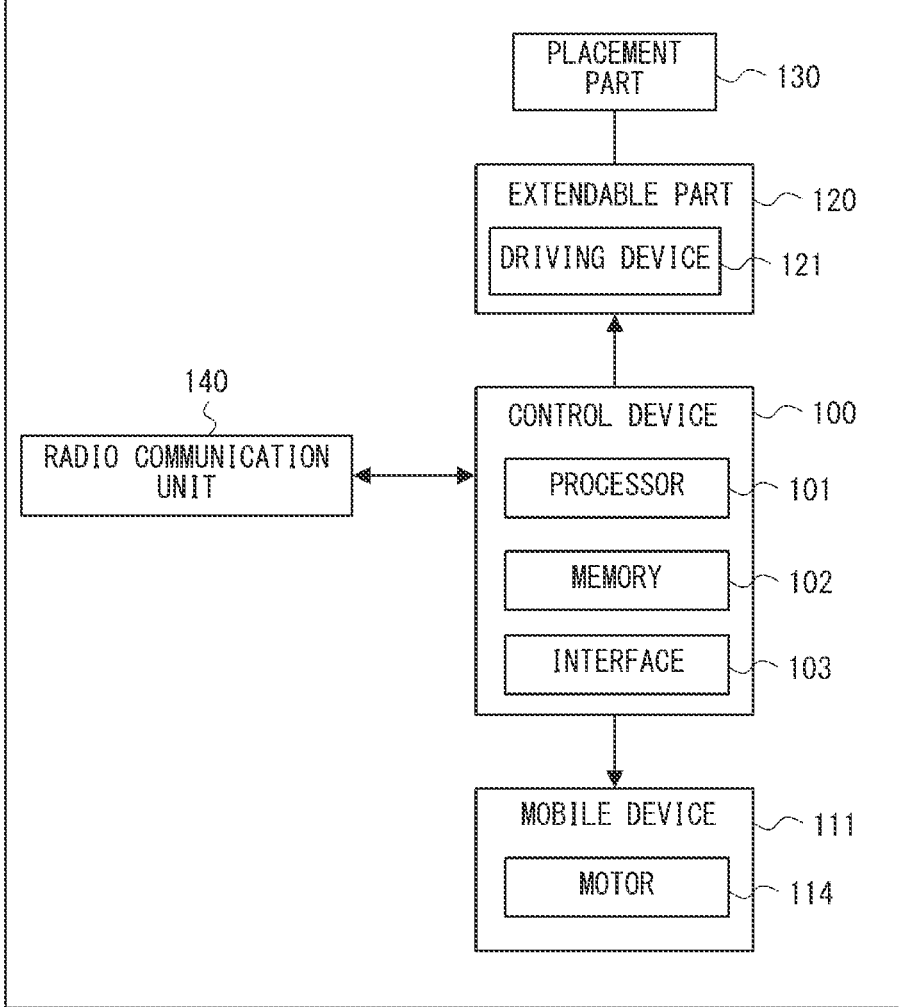
FIG. 2 is a block diagram showing an overview of system configuration of an autonomous mobile robot according to the first embodiment.
Figure 3:
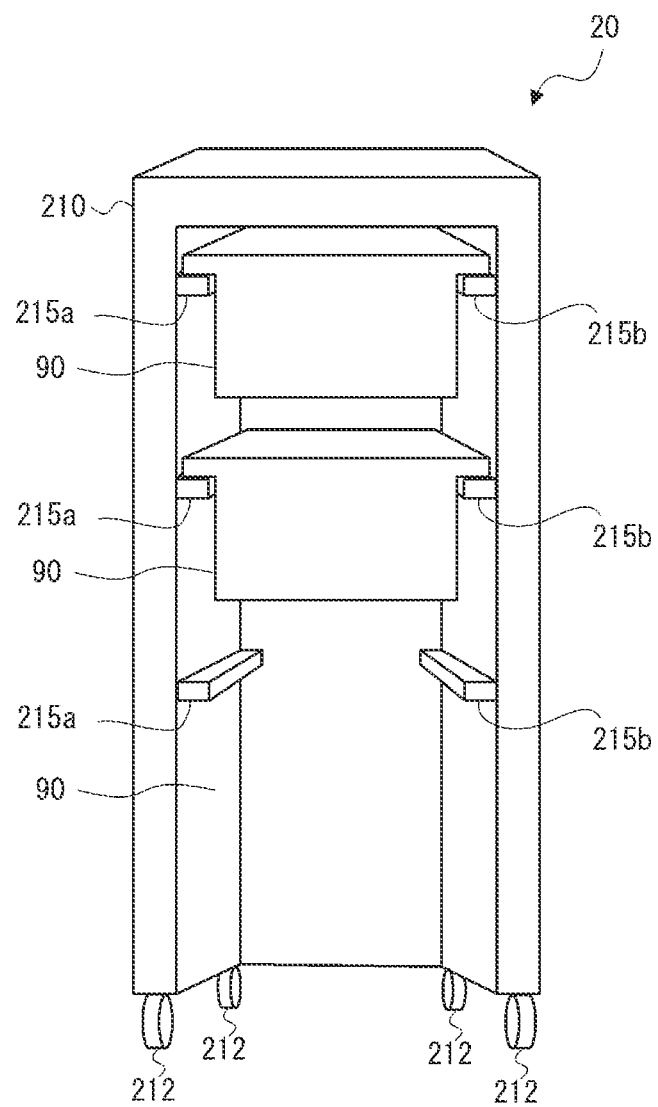
FIG. 3 is a schematic perspective view showing an example of a carriage according to the first embodiment.
Figure 4:
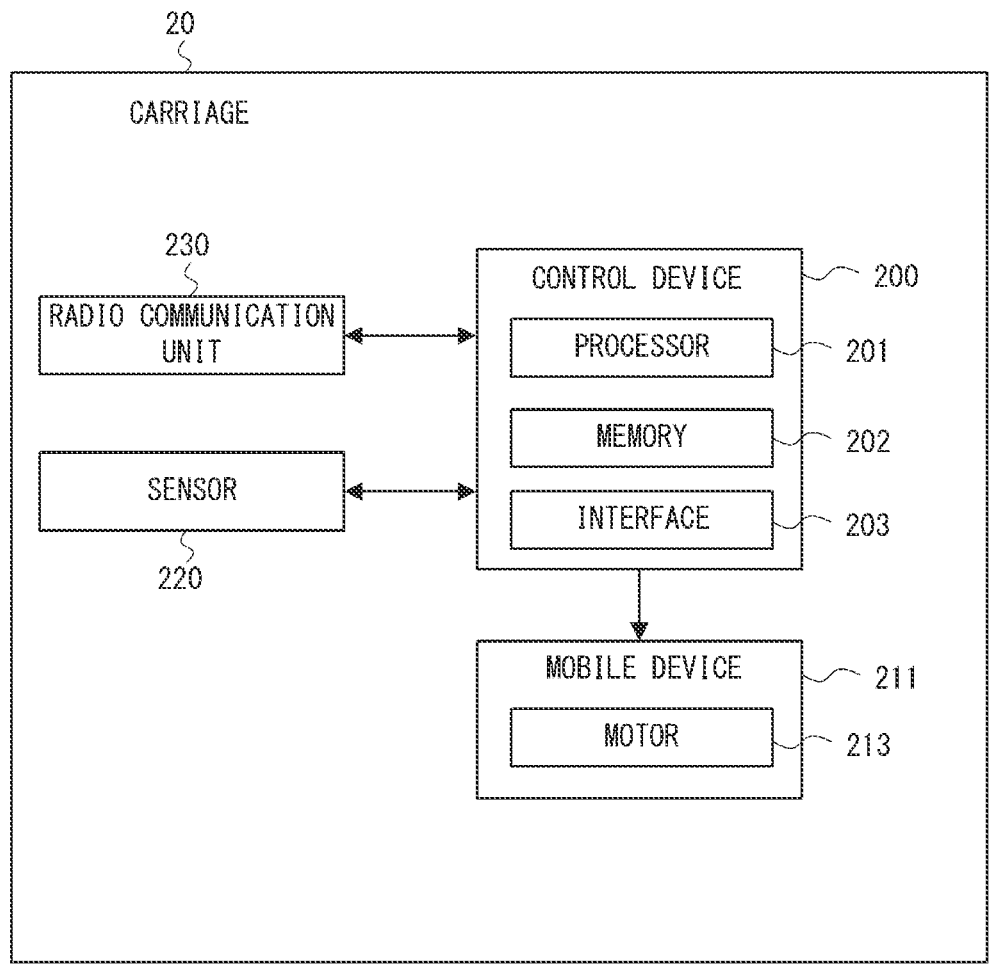
FIG. 4 is a block diagram showing an overview of a system configuration of the carriage according to the first embodiment.

FIG. 1 is a schematic side view showing an example of the autonomous mobile robot 10 according to this embodiment. FIG. 2 is a block diagram showing an overview of a schematic system configuration of the autonomous mobile robot 10 according to this embodiment. FIG. 3 is a schematic perspective view showing an example of the carriage 20 according to this embodiment. Specifically, FIG. 3 is a perspective view showing a front surface of the carriage 20. In addition to the carriage 20, a load 90 housed in the carriage 20 is also shown in FIG. 3. FIG. 4 is a block diagram showing an overview of a schematic system configuration of the carriage 20 according to this embodiment.

First, the autonomous mobile robot 10 will be described. The autonomous mobile robot 10 is a robot that moves autonomously in a mobile environment such as a house, a facility, a warehouse, a factory, or outdoors. In this embodiment, the autonomous mobile robot 10 is controlled by a control device 100, which will be described later, but some or all of the control functions may be implemented by a device other than the autonomous mobile robot 10, such as a server.

The autonomous mobile robot 10 includes a chassis 110 provided with a mobile device 111 for moving the autonomous mobile robot 10, an extendable part 120 which is extendable and contractable in an up-down direction (in a vertical direction), a placement part 130 for supporting a load placed thereon, a control device 100 for controlling the autonomous mobile robot 10 including the control of the mobile device 111 and the extendable part 120, and a radio communication unit 140.

The mobile device 111 provided in the chassis 110 includes a pair of left and right driving wheels 112 rotatably provided on the chassis 110, a pair of front and rear driven wheels 113 rotatably provided on the chassis 110, and a pair of motors 114 for rotationally driving the driving wheels 112. The motors 114 rotate the driving wheels 112 through a reduction gear or the like. The motors 114 rotate the driving wheels 112 in response to a control signal from the control device 100, thereby enabling the autonomous mobile robot 10 to move forward, backward, and rotate. Thus, the autonomous mobile robot 10 can move to any position. The configuration of the mobile device 111 is an example and is not limited thereto. For example, the number of the driving wheels 112 and the driven wheels 113 of the mobile device 111 may be any number, and any configuration can be employed as long as the autonomous mobile robot 10 can be moved to any position.

The extendable part 120 is an extendable mechanism which can be extended and contracted in the up-down direction, and is a support pillar for supporting the placement part 130 above the chassis 110. The extendable part 120 may be configured as a telescopic extendable mechanism. The placement part 130 is provided at an upper end of the extendable part 120, and the placement part 130 is raised or lowered by an operation of the extendable part 120. The extendable part 120 includes a driving device 121 such as a motor, and is extended or contracted by driving the driving device 121. That is, the placement part 130 is raised or lowered by driving the driving device 121. The driving device 121 is driven in response to a control signal from the control device 100. In the autonomous mobile robot 10, any known mechanism for controlling the height of the placement part 130 provided above the chassis 110 may be used instead of the extendable mechanism.

The placement part 130 is provided at an upper part (a leading end) of the extendable part 120. That is, the placement part 130 is provided above the chassis 110 of the autonomous mobile robot 10 with the extendable part 120 interposed therebetween. The placement part 130 is raised and lowered by the driving device 121 such as a motor. In this embodiment, the placement part 130 is used to place a load to be transported by the autonomous mobile robot 10 or to support and raise the load. In order to transport the load, the autonomous mobile robot 10 moves with the load in a state in which the load is being supported by the placement part 130. In this manner, the autonomous mobile robot 10 transports loads.

The placement part 130 is made of, for example, a plate material. In this embodiment, a shape of the plate material, that is, the shape of the placement part 130 is, for example, a flat disk shape, but it may be any other shape. As described above, the placement part 130 can be described as a plate whose height is changed by the driving device 121 (actuator).

The radio communication unit 140 is a circuit for radio communication in order to communicate with the carriage 20 or a server as needed, and includes, for example, a radio transmission and reception circuit and an antenna. If the autonomous mobile robot 10 does not communicate with other devices, the radio communication unit 140 may be omitted.

The control device 100 controls the autonomous mobile robot 10 and includes a processor 101, a memory 102, and an interface 103. The processor 101, the memory 102, and the interface 103 are connected to each other via a data bus or the like.

The interface 103 is an input/output circuit used to communicate with other devices such as the mobile device 111, the extendable part 120, and the radio communication unit 140.

The memory 102 is composed of, for example, a combination of a volatile memory and a non-volatile memory. The memory 102 is used to store software (computer program) including one or more instructions executed by the processor 101, data used for various processing of the autonomous mobile robot 10, and the like.

The processor 101 reads software (computer program) from the memory 102 and executes it to perform processing of the control device 100.

The processor 101 may be, for example, a microprocessor, a Micro Processor Unit (MPU), or a central processing unit (CPU). The processor 101 may include a plurality of processors.

In this way, the control device 100 functions as a computer.

The program includes instructions (or software codes) that, when loaded into a computer, cause the computer to perform one or more of the functions described in the embodiments. The program may be housed in a non-transitory computer readable medium or a tangible housing medium. By way of example, and not a limitation, non-transitory computer readable media or tangible housing media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc housing, and magnetic cassettes, magnetic tape, magnetic disk housing or other types of magnetic housing devices. The program may be transmitted on a transitory computer readable medium or a communication medium. By way of example, and not a limitation, transitory computer readable media or communication media can include electrical, optical, acoustical, or other forms of propagated signals.

The above description of the program is the same as that of the program executed by the other devices such as the carriage 20.

Next, the processing of the control device 100 will be described.

The control device 100 controls the operation of the autonomous mobile robot 10. That is, the control device 100 controls the operations of the mobile device 111 and the extendable part 120. The control device 100 can control the rotation of the driving wheels 112, and move the autonomous mobile robot 10 to any position by transmitting a control signal to the motors 114 of the mobile device 111. Furthermore, the control device 100 can control the height of the placement part 130 by transmitting a control signal to the driving device 121 of the extendable part 120.

The control device 100 may control the movement of the autonomous mobile robot 10 by performing well-known control such as feedback control and robust control based on rotation information of the driving wheels 112 detected by rotation sensors provided on the driving wheels 112. The control device 100 may control the mobile device 111 based on information including environmental information detected by a sensor such as a camera provided in the autonomous mobile robot 10 and map information of the mobile environment stored in the memory 102, thereby controlling the autonomous mobile robot 10 to autonomously move.

In particular, the control device 100 performs control to transport the load placed on the placement part 130 to the carriage 20. Thus, the control device 100 moves the autonomous mobile robot 10 to the position of the carriage 20 in order to transport the load to the carriage 20. The position of the carriage 20 may be transmitted to the autonomous mobile robot 10 from another device (e.g., the server or the carriage 20) or may be specified based on the environmental information detected by a sensor provided in the autonomous mobile robot 10. In addition, the control device 100 performs control so that the height of the placement part 130 becomes a height corresponding to the height of a position in the carriage 20 where the load is to be housed prior to housing the load in the carriage 20.

Next, the carriage 20 will be described. The carriage 20 is also a robot that moves autonomously in the mobile environment such as a house, a facility, a warehouse, a factory, or outdoors, and its operation is controlled by a control system. In this embodiment, a control device 200 described later of the carriage 20 functions as a control system, but some or all functions of the control system may be implemented by a device other than the carriage 20, such as a server. The sections where the carriage 20 move may be different from the sections where the autonomous mobile robot 10 move. For example, the autonomous mobile robot 10 may move within a local area, and the carriage 20 may move between a plurality of local areas.

The carriage 20 includes a chassis 210 (which may be referred to as a rack 210 or housing 210) provided with a mobile device 211 for moving the carriage 20, the control device 200 for controlling the carriage 20 including the control of the mobile device 211, a sensor 220, and a radio communication unit 230.

The mobile device 211 provided in the chassis 210 includes, for example, four driving wheels 212 rotatably provided on the chassis 210, and a motor 213 for rotationally driving the driving wheels 212. The motor 213 rotates the driving wheels 212 through a reduction gear or the like. The motor 213 rotates the driving wheels 212 in response to a control signal from the control device 200, thereby enabling the carriage 20 to move forward, backward, and rotate. Thus, the carriage 20 can be moved to any position. A configuration of the mobile device 211 is an example, and is not limited thereto, and any configuration can be employed as long as the carriage 20 can be moved to any position.

The chassis 210 constitutes a vehicle body of the carriage 20. The chassis 210 has a space inside. In the example shown in FIG. 3, the chassis 210 has a rectangular parallelepiped shape. A front surface of the chassis 210 has an inverted U-shaped and is opened. That is, a cross-sectional shape of the chassis 210 in a vertical direction is an inverted U-shape. Therefore, the load 90 can be put into a housing space in the chassis 210 and the load 90 can be taken out from the housing space in the chassis 210 through the opening. Here, the housing space means a space in the chassis 210 where the load 90 is housed. In particular, since the opening is opened to the traveling surface (a ground surface or a floor surface) of the carriage 20, the autonomous mobile robot 10 with the load 90 placed on the placement part 130 can enter the inside of the chassis 210. In other words, the carriage 20 can be moved to receive the autonomous mobile robot 10 into the chassis 210. As described above, the chassis 210 is opened so that the autonomous mobile robot 10 can enter the chassis 210 together with the load 90 on the placement part 130. Here, an open surface of the outer surface excluding the upper surface and the lower surface of the chassis 210 is referred to as the front surface. A rear surface of the chassis 210 may also be open in the same manner as the front surface.

The loads 90 are housed in the chassis 210. In the example shown in FIG. 3, a plurality of loads 90 can be housed in the chassis 210 arranged along a vertical line. In the example shown in FIG. 3, the chassis 210 has one row of housing spaces, but a plurality of rows of housing spaces may be included by providing partition plates parallel to a vertical plane in the chassis 210.

Pairs of rails 215a and 215b are provided on both sides of an inside of the chassis 210, that is, in the housing space. Hereinafter, each pair of rails 215a and 215b will be referred to simply as rails 215. More specifically, a plurality of pairs of rails 215 are arranged in the up-down direction. The rail 215a and the rail 215b are provided at the same height in parallel from the front surface to the rear surface of the chassis 210. In the carriage 20 shown in FIG. 3, the plurality of pairs of rails 215 are provided in the up-down direction at a constant interval, but the interval may not be constant. By supporting the load 90 on the both sides thereof by the rails 215, the load 90 is housed in the carriage 20. More specifically, projections 91, which will be described later, of the load 90 are supported by the rails 215. The rail 215 is an example of a support part for supporting the projection 91 of the load 90. In place of the rails 215, grooves provided in parallel from the front surface to the rear surface of the chassis 210 may be used as support parts. That is, the chassis 210 may be provided with an optional support member for supporting both sides of the load 90.

Figure 5:
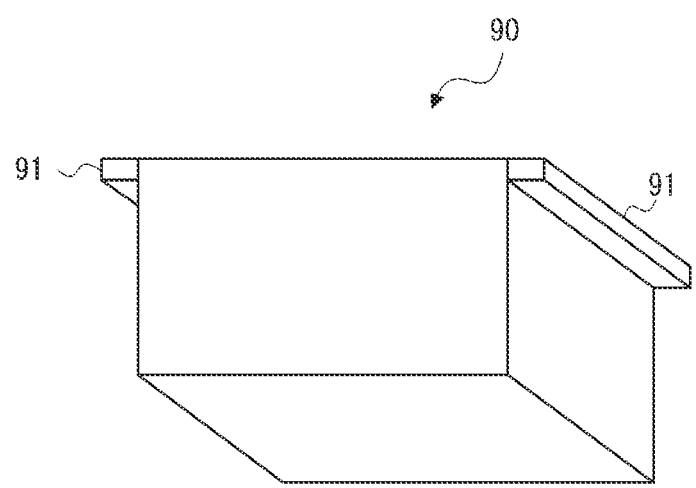
FIG. 5 is a perspective view showing an example of a load housed in the carriage.
Figure 6:
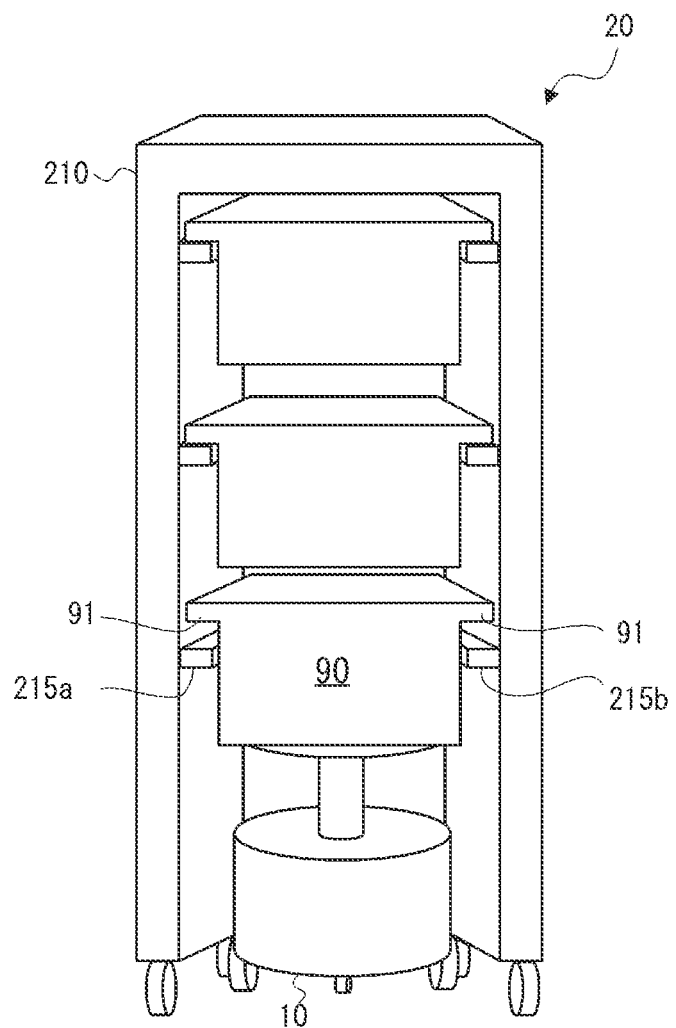
FIG. 6 is a schematic diagram showing an autonomous mobile robot entered in a chassis of the carriage.

In this embodiment, the load 90 housed in the carriage 20 is a rectangular box, and articles can be housed therein. FIG. 5 is a perspective view showing an example of the load 90 housed in the carriage 20. More particularly, FIG. 5 is a perspective view showing the front surface, bottom surface, and side surfaces of the load 90. The projections 91 (flanges) projecting in the horizontal direction are provided on both sides of the load 90. The projections 91 are provided on both sides of the load 90 from the front surface to the rear surface. The right and left projections 91 are supported from below by the rails 215 provided on the carriage 20, whereby the load 90 is housed in the chassis 210. For example, after the autonomous mobile robot 10 enters the chassis 210 in a state where the positions of the projections 91 of the load 90 on the placement part 130 of the autonomous mobile robot 10 are higher than the position of the rails 215 (see FIG. 6), the autonomous mobile robot 10 lowers the placement part 130, so that the projections 91 are caught by the rails 215 and the load 90 is housed in the carriage 20.

Referring back to FIG. 4, the configuration of the carriage 20 will be described.

The sensor 220 is installed at any position of the carriage 20. The sensor 220 is for detecting information about an external appearance of the autonomous mobile robot 10. For example, the sensor 220 is a camera, and instead may be any sensor that detects the information about an external appearance of an object, such as a LiDAR (light detection and ranging) sensor. An output of the sensor 220 is input to the control device 200. In this embodiment, the sensor 220 is used to specify the height of the placement part 130 of the autonomous mobile robot 10 or the height of the load 90 on the placement part 130. The height of the placement part 130 means a vertical distance between the position where the placement part 130 is present and a ground surface or a floor surface. Similarly, the height of the load 90 above the placement part 130 refers to a vertical distance between the position where the load 90 is present and the ground surface or the floor surface.

The radio communication unit 230 is a circuit for radio communication in order to communicate with the autonomous mobile robot 10 or a server as needed, and includes, for example, a radio transmission and reception circuit and an antenna. If the carriage 20 does not communicate with other devices, the radio communication unit 230 may be omitted.

The control device 200 controls the carriage 20 and includes a processor 201, a memory 202, and an interface 203. The processor 201, the memory 202, and the interface 203 are connected to each other via a data bus or the like.

The interface 203 is an input/output circuit used to communicate with other devices such as the mobile device 211, the sensor 220, and the radio communication unit 230.

The memory 202 is composed of, for example, a combination of a volatile memory and a non-volatile memory. The memory 202 is used to store software (computer program) including one or more instructions executed by the processor 201, data used for various processing of the carriage 20, and the like.

The processor 201 reads software (computer program) from the memory 202 and executes it to perform processing of the control device 200.

The processor 201 may be, for example, a microprocessor, MPU, or CPU. The processor 201 may include a plurality of processors.

In this way, the control device 200 functions as a computer.

Figure 7:
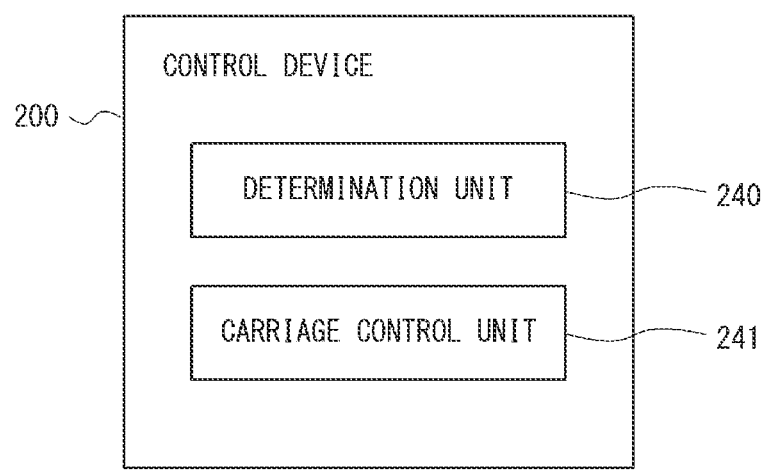
FIG. 7 is a block diagram showing an example of a functional configuration of a control device of the carriage according to the first embodiment.

FIG. 7 is a block diagram showing an example of a functional configuration of the control device 200 of the carriage 20. As shown in FIG. 7, the control device 200 includes a determination unit 240 and a carriage control unit 241.

The determination unit 240 determines whether or not the autonomous mobile robot 10 is planned to move toward the carriage 20 in a state in which the load 90 is raised to a predetermined height or higher by the placement part 130. Since such a movement is a movement in a state in which the stability of the posture of the autonomous mobile robot 10 is lowered, the movement will hereinafter be referred to as an unstable movement.

The determination unit 240 determines whether or not the autonomous mobile robot 10 detected to be the autonomous mobile robot 10 for housing the load 90 placed on the placement part 130 in the carriage 20 is planned for an unstable movement. Note that the detection of the autonomous mobile robot 10 for housing the load 90 placed on the placement part 130 in the carriage 20 can be performed by any method. For example, such an autonomous mobile robot 10 may be detected based a notification from the autonomous mobile robot 10 that houses the load 90 placed on the placement part 130 in the carriage 20. Alternatively, the autonomous mobile robot 10 present in an area within a predetermined distance from the carriage 20 may be detected as such an autonomous mobile robot 10.

In this embodiment, the determination unit 240 determines whether or not an unstable movement is planned based on the information indicating the height of the placement part 130 detected by using the sensor 220 or the height of the load 90 on the placement part 130 detected by using the sensor 220. For example, when the height of the placement part 130 of the autonomous mobile robot 10 specified from information about the output of the sensor 220 is greater than or equal to a predetermined threshold value, the determination unit 240 determines that the autonomous mobile robot 10 is planned for an unstable movement. When the height of the load 90 on the placement part 130 specified from the information about the output of the sensor 220 is greater than or equal to the predetermined threshold value, the determination unit 240 determines that the autonomous mobile robot 10 having the placement part 130 is planned for an unstable movement.

The carriage control unit 241 controls the movement of the carriage 20. That is, the carriage control unit 241 controls the operation of the mobile device 211. The carriage control unit 241 can control the rotation of the driving wheels 212, and move the carriage 20 to any position by transmitting a control signal to the motor 213 of the mobile device 211.

The carriage control unit 241 may control the movement of the carriage 20 by performing well-known control such as feedback control and robust control based on rotation information of the driving wheels 212 detected by rotation sensors provided on the driving wheels 212. The carriage control unit 241 may control the mobile device 211 based on information including environmental information detected by a sensor such as a camera provided in the carriage 20 and map information of the mobile environment housed in the memory 202, thereby controlling the carriage 20 to autonomously move. The sensor 220 used to specify the height of the placement part 130 of the autonomous mobile robot 10 or the height of the load 90 on the placement part 130 may be used to sense the mobile environment during the movement of the carriage 20.

In particular, the carriage control unit 241 controls the carriage 20 so that the carriage 20 moves toward the autonomous mobile robot 10 when it is determined that the autonomous mobile robot 10 is planned to move toward the carriage 20 in a state in which the load 90 is raised to a predetermined height or higher by the placement part 130. That is, when the determination unit 240 determines that the autonomous mobile robot 10 is planned for an unstable movement, the carriage control unit 241 controls the carriage 20 so that it moves toward the autonomous mobile robot 10. Such control reduces the distance that the autonomous mobile robot 10 moves toward the carriage 20, because the carriage 20 moves toward the autonomous mobile robot 10. Therefore, it is possible to reduce the distance that the autonomous mobile robot 10 moves in a state where the load 90 is placed on the raised placement part 130, that is, in an unstable state. It is thus possible to reduce the risk due to the lowering of the level of the stability of the posture of the autonomous mobile robot 10.

Figure 8A:
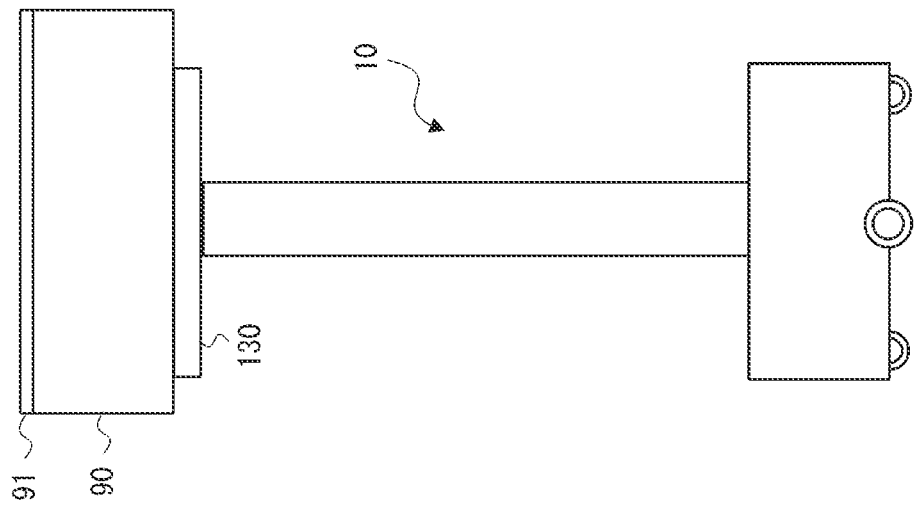
FIG. 8A is a schematic diagram showing a movement of the carriage under control of a carriage control unit.
Figure 8A:
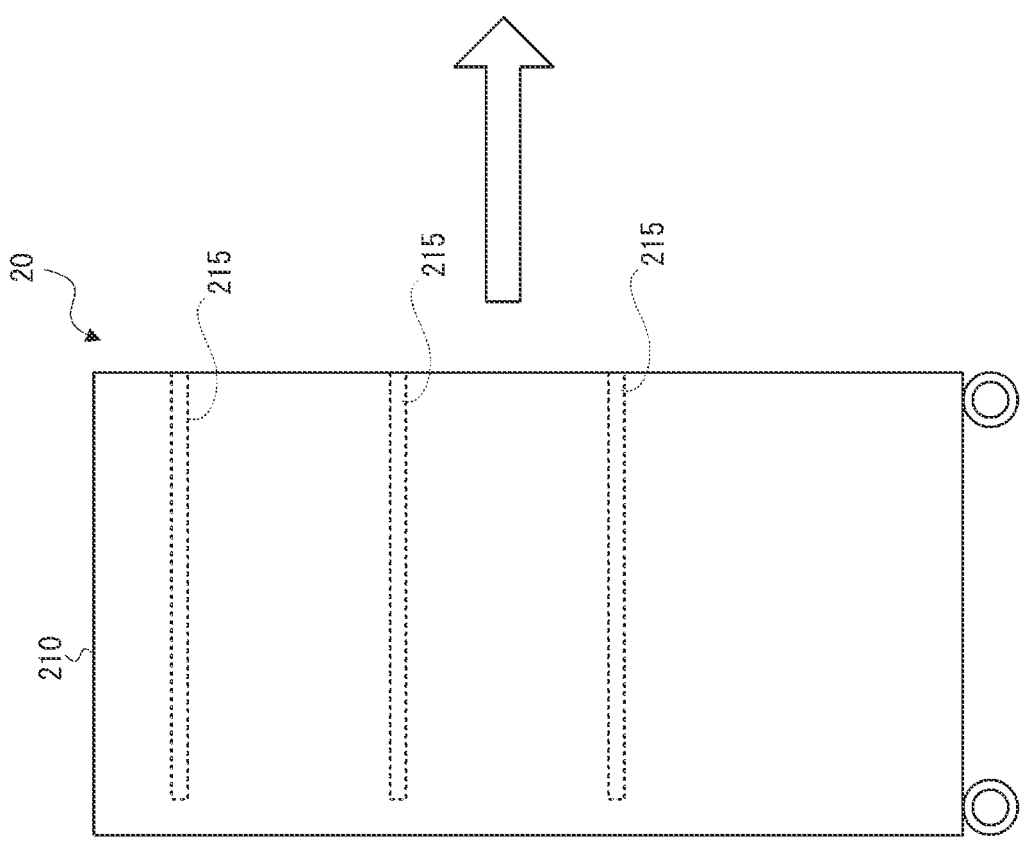
Figure 8B:
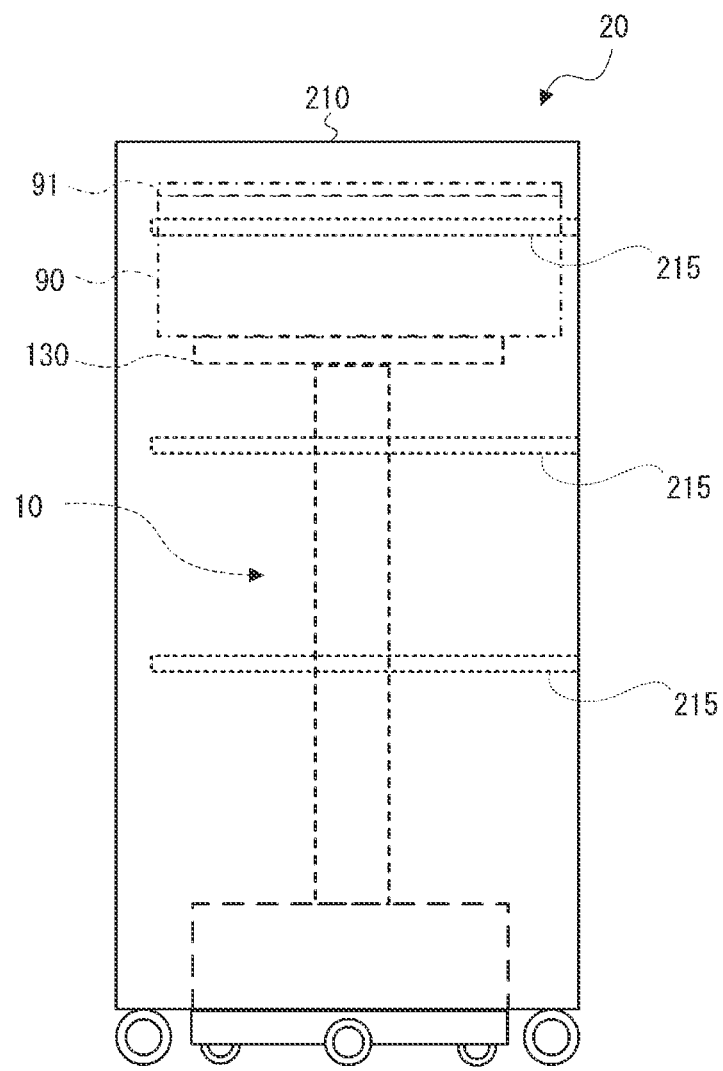
FIG. 8B is a schematic diagram showing a movement of the carriage under the control of the carriage control unit.

If the determination unit 240 determines that the autonomous mobile robot 10 is planned for an unstable movement, the carriage control unit 241 may perform the following control for moving the carriage 20 toward the autonomous mobile robot 10. That is, the carriage control unit 241 may move the carriage 20 so that the placement part 130 enters the chassis 210 (that is, the carriage control unit 241 may move the carriage 20 so as to realize a state in which the placement part 130 has entered the chassis 210). Here, the state in which the placement part 130 has entered means, for example, a state in which the load 90 on the placement part 130 has reached a position in the chassis 210 where a load is housed. Specifically, it can be said that the state in which the placement part 130 enters is a state in which the projections 91 on both sides of the load 90 are positioned directly above the pair of rails 215. The state in which the placement part 130 has entered may be a state in which at least a part of the placement part 130 has entered. Such control is shown in FIGS. 8A and 8B. When the determination unit 240 determines that the autonomous mobile robot 10 is planned for an unstable movement, as shown in FIG. 8A, the carriage control unit 241 controls the carriage 20 so that it moves toward the autonomous mobile robot 10. At this time, the carriage control unit 241 may adjust an orientation of the carriage 20 so that the orientation of the pair of rails 215 relative to the projections 91 on both sides of the load 90 becomes the orientation required for housing. That is, the carriage control unit 241 may adjust the orientation of the carriage 20 so that the direction in which the rails 215 are extended match the direction in which the projections 91 are extended. The autonomous mobile robot 10 may adjust the orientation of the autonomous mobile robot 10. Needless to say, if the relative orientation of the pair of rails 215 with respect to the projections 91 on both sides of the load 90 already match the orientation required for housing, no adjustment of the orientation of the carriage 20 or the autonomous mobile robot 10 is necessary. As shown in FIG. 8B, the carriage control unit 241 controls the carriage 20 so that it moves in such a way that the placement part 130 enters the chassis 210. That is, the carriage control unit 241 moves the carriage 20 so as to receive the autonomous mobile robot 10 into the chassis 210. In the state shown in FIG. 8B, when the autonomous mobile robot 10 lowers the placement part 130, the projections 91 on both sides of the load 90 are caught by the rails 215, and thus the load 90 is housed. The autonomous mobile robot 10 moves so as to get out of the carriage 20. When the load 90 is housed in the carriage 20, for example, the carriage control unit 241 moves the carriage 20 to the destination in order to transport the load 90 to the destination.

Such control enables the load 90 to be housed in the carriage 20 by the movement of the carriage 20, not by the movement of the autonomous mobile robot 10. Therefore, the risk due to the movement of the autonomous mobile robot 10 for housing the load 90 in the carriage 20 can be reduced. In order to house the load 90, not only the carriage 20 but also the autonomous mobile robot 10 may move. That is, the carriage 20 and the autonomous mobile robot 10 may move in a direction approaching each other.

The housing of the load 90 in the carriage 20 may be achieved only by the movement of the autonomous mobile robot 10. In this case, the control device 100 of the autonomous mobile robot 10 detects an opening of the carriage 20 (the chassis 210) by a sensor or the like, and controls the autonomous mobile robot 10 so that it moves from the opening into the chassis 210. At this time, the control device 100 adjusts the orientation of the autonomous mobile robot 10 so that the orientation of the projections 91 on both sides of the load 90 with respect to the pair of rails 215 of the carriage 20 become the orientation required for housing. In this case, it is assumed that the orientation of the projections 91 of the load 90 on the placement part 130 is known to the autonomous mobile robot 10. The orientation of the projection 91 of the load 90 on the placement part 130 may be detected by a sensor or the like provided in the autonomous mobile robot 10. Further, an operational rule may be defined so that the orientation of the load 90 on the placement part 130 (the orientation of the projections 91) becomes constant, or the orientation of the load 90 may be physically limited.

Figure 9:
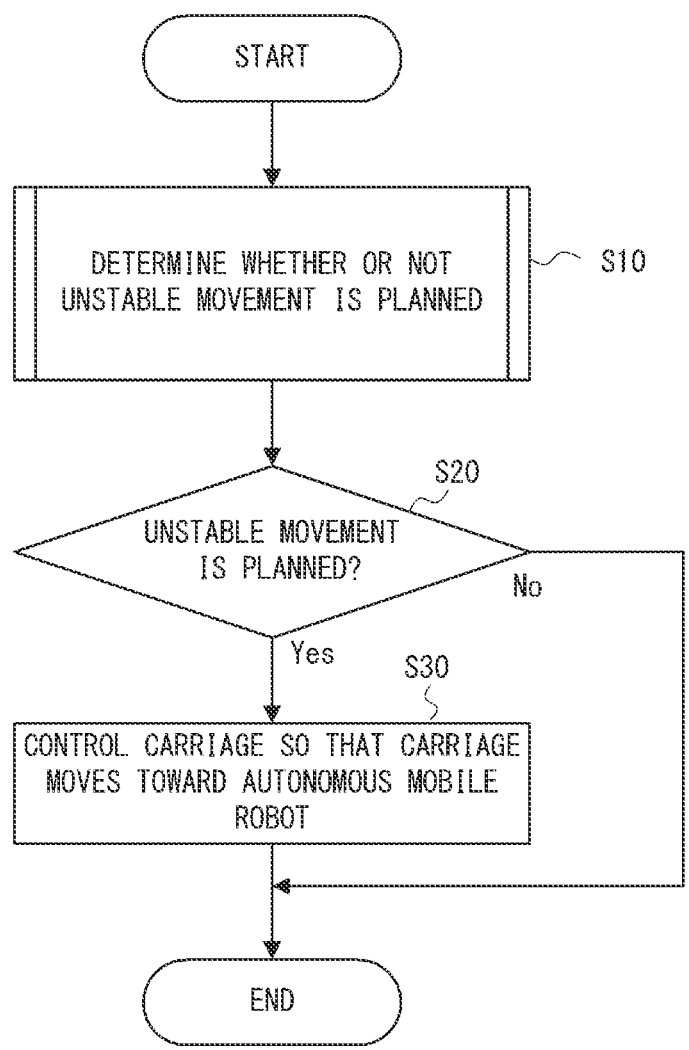
FIG. 9 is a flowchart showing an example of a processing flow of the control device of the carriage according to the first embodiment.

FIG. 9 is a flowchart showing an example of a processing flow of the control device 200 of the carriage 20 according to this embodiment. The processing flow of the control device 200 of the carriage 20 will be described below with reference to the flowchart.

Figure 10:
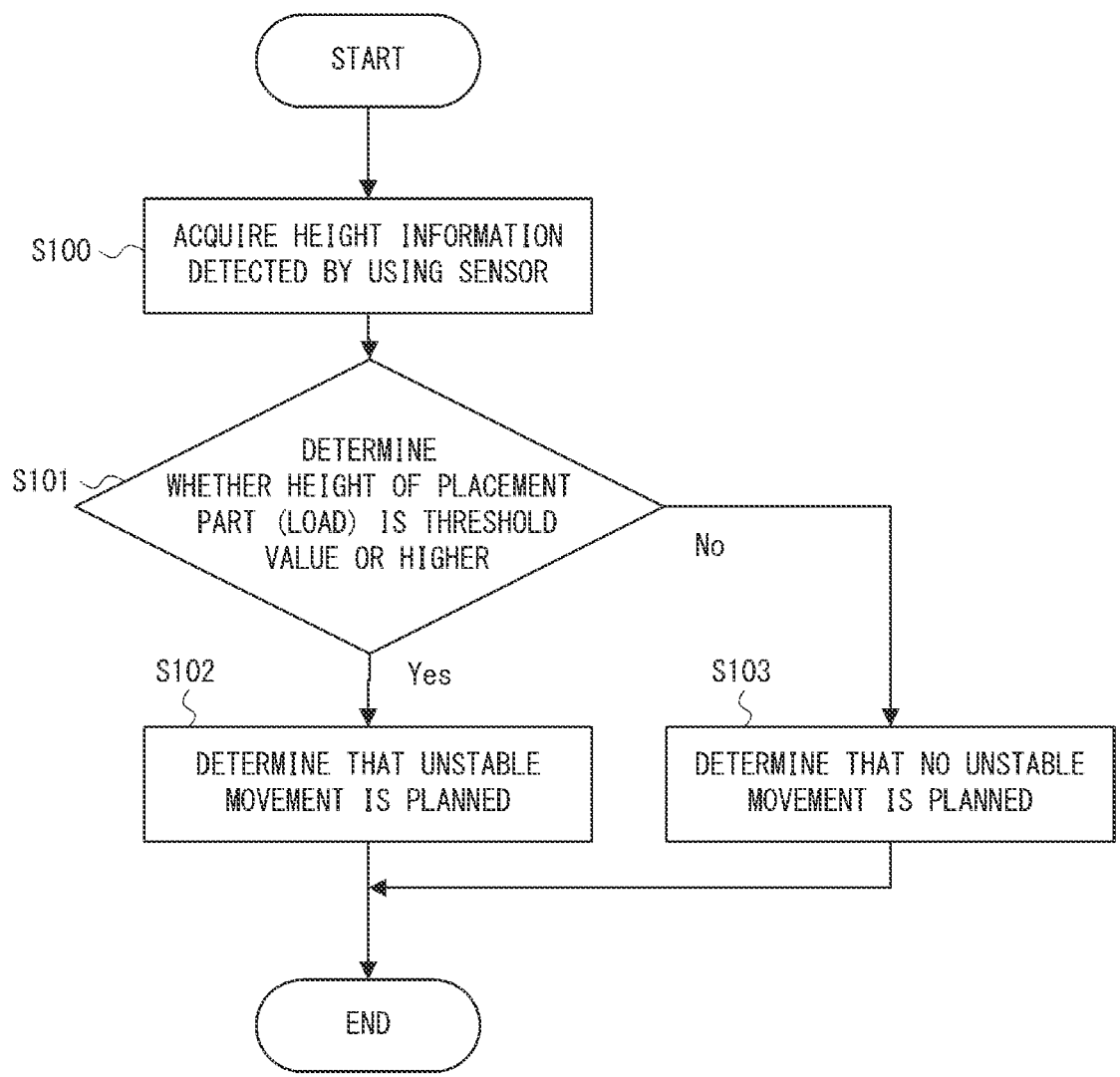
FIG. 10 is a flowchart showing a processing flow of a determination unit according to the first embodiment.

In Step S10, the determination unit 240 determines whether or not an unstable movement is planned. A specific process of Step S10 according to this embodiment will be described with reference to FIG. 10. FIG. 10 is a flowchart showing the processing flow of the determination unit 240 according to this embodiment. That is, FIG. 10 is a flowchart showing a specific processing flow of Step S10 according to this embodiment.

First, in Step S100, the determination unit 240 acquires information indicating the height of the placement part 130 (the height of the load 90 on the placement part 130) detected by using the sensor 220. For example, the determination unit 240 obtains the height of the placement part 130 (the height of the load 90 on the placement part 130) by specifying the position of the placement part 130 (the position of the load 90 on the placement part 130) from the information about the output of the sensor 220. In order to detect the height of the placement part 130 (the height of the load 90 on the placement part 130), a sensor provided in the mobile environment may be used instead of the sensor 220 provided on the carriage 20.

Next, in Step S101, the determination unit 240 determines whether the height obtained in Step S100 is greater than or equal to a predetermined threshold value. If the height acquired in Step S100 is greater than or equal to the predetermined threshold value (Yes in Step S101), the determination unit 240 determines in Step S102 that an unstable movement is planned. On the other hand, if the height obtained in Step S100 is less than the predetermined threshold value (No in Step S101), the determination unit 240 determines in Step S103 that no unstable movement is planned.

Referring back to FIG. 9, the processing after Step S10 will be described. If it is determined in Step S10 that an unstable movement is planned (Yes in Step S20), the processing of Step S30 is performed, and if it is determined in Step S10 that an unstable movement is not planned (No in Step S20), the processing of Step S30 is not performed.

In Step S30, the carriage control unit 241 controls the carriage 20 so that it moves toward the autonomous mobile robot 10 which houses the load 90 in the carriage 20. At this time, as described above, the carriage control unit 241 may move the carriage 20 so that the placement part 130 of the autonomous mobile robot 10 enters the chassis 210.

The first embodiment has been described above. According to this embodiment, as described above, when an unstable movement of the autonomous mobile robot 10 is planned, the carriage 20 moves toward the autonomous mobile robot 10, so that the risk due to the lowering of the level of the stability of the posture of the autonomous mobile robot 10 is reduced.

Second Embodiment

In this embodiment, a method for determining whether or not an unstable movement is planned is different from that of the above-described embodiment. Although the processing of the determination unit 240 of the control device 200 according to this embodiment is different from that according to the first embodiment, other processing and configuration according to this embodiment are the same as those according to the first embodiment. Hereinafter, the points of this embodiment different from those the first embodiment will be described, and the description overlapping with the first embodiment will be omitted.

In this embodiment, the determination unit 240 determines whether or not the autonomous mobile robot 10 is planned for an unstable movement based on control information about the height of the placement part 130 received from the autonomous mobile robot 10 which houses the load 90 in the carriage 20. The control information about the height of the placement part 130 is information used by the control device 100 of the autonomous mobile robot 10, and may be, for example, a control signal transmitted to the driving device 121 in order to change the height of the placement part 130, or may be information indicating the current height of the placement part 130 managed by the control device 100. In this embodiment, the control device 100 of the autonomous mobile robot 10 transmits such control information about the height of the placement part 130 to the carriage 20 where the load 90 is housed. The determination unit 240 of the carriage 20 which has received the control information specifies the height of the placement part 130 from the received control information. If the received information is a control signal, the determination unit 240 may specify the height of the placement part 130 from the control signal by referring to, for example, a predefined lookup table.

When the height of the specified placement part 130 is greater than or equal to a predetermined threshold value, the determination unit 240 determines that the autonomous mobile robot 10 is planned for an unstable movement. If it is determined by the determination unit 240 that the autonomous mobile robot 10 is planned for an unstable movement, the carriage control unit 241 performs the same control as that in the first embodiment.

Figure 11:
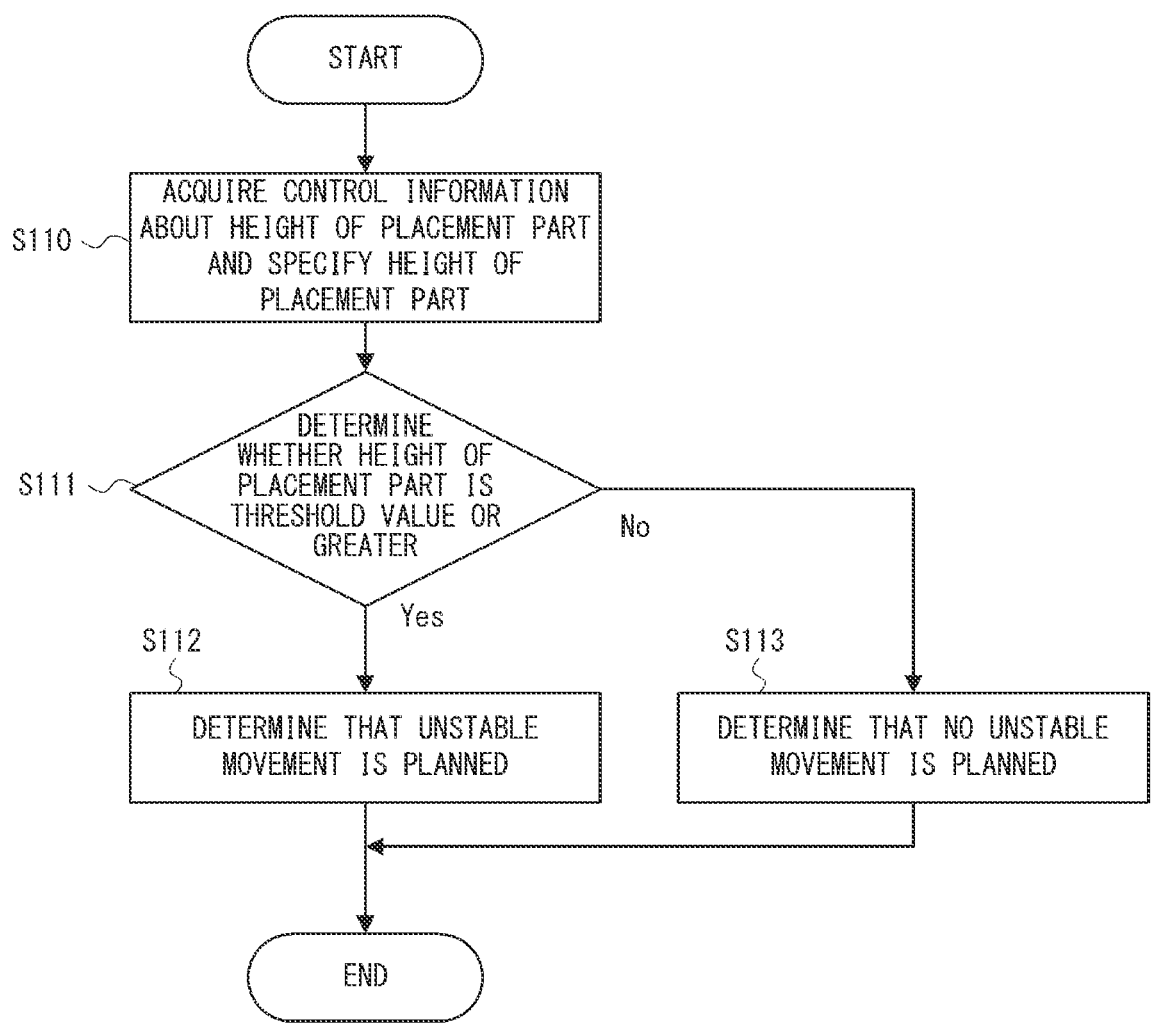
FIG. 11 is a flowchart showing a processing flow of the determination unit according to a second embodiment.

FIG. 11 is a flowchart showing a processing flow of the determination unit 240 according to the second embodiment. That is, FIG. 11 is a flowchart showing a specific processing flow of Step S10 (see FIG. 9) according to the second embodiment. In this embodiment, the processing from Step S110 to Step S113 is performed as the specific processing of Step S10.

First, in Step S110, the determination unit 240 acquires the control information about the height of the placement part 130 used by the control device 100 of the autonomous mobile robot 10. Then, the determination unit 240 specifies the height of the placement part 130 from the acquired control information.

Next, in Step S111, the determination unit 240 determines whether or not the height specified in Step S110 is greater than or equal to a predetermined threshold value. If the height specified in Step S110 is greater than or equal to the predetermined threshold value (Yes in Step S111), the determination unit 240 determines in Step S112 that an unstable movement is planned. On the other hand, if the height obtained in Step S110 is less than the predetermined threshold value (No in Step S111), the determination unit 240 determines in Step S113 that no unstable movement is planned.

The second embodiment has been described above. Also in this embodiment, when an unstable movement of the autonomous mobile robot 10 is planned, the carriage 20 moves toward the autonomous mobile robot 10, so that the risk due to the lowering of the level of the stability of the posture of the autonomous mobile robot 10 is reduced.

Third Embodiment

Also in this embodiment, a method for determining whether or not an unstable movement is planned is different from those of the above-described embodiments. Although the processing of the determination unit 240 of the control device 200 according to this embodiment is different from that according to the first embodiment, other processing and configuration according to this embodiment are the same as those according to the first embodiment. Hereinafter, the points of this embodiment different from those of the first embodiment will be described, and the description overlapping with the first embodiment will be omitted.

In this embodiment, the determination unit 240 determines whether or not the autonomous mobile robot 10 is planned for an unstable movement based on a planned housing position of the load 90 in the carriage 20. When the planned housing position of the load 90 is at a high position, it is expected that the autonomous mobile robot 10 will move in a state in which the placement part 130 raised high to house the load 90 at the planned housing position. Therefore, in this embodiment, it is determined whether or not the autonomous mobile robot 10 is planned for an unstable movement based on the planned housing position. The carriage 20 may receive the planned housing position from the autonomous mobile robot 10 which houses the load 90 in the carriage 20, or may receive it from another server. Further, when the position in the chassis 210 where a load can be housed is managed, the planned housing position may be specified from information indicating the position where a load can be housed. In this case, for example, the determination unit 240 may specify the highest position where a load can be housed as the planned housing position.

If the height of the planned housing position of the load 90 housed by the autonomous mobile robot 10 is greater than or equal to a predetermined threshold value, the determination unit 240 determines that the autonomous mobile robot 10 is planned for an unstable movement. If it is determined by the determination unit 240 that the autonomous mobile robot 10 is planned for an unstable movement, the carriage control unit 241 performs the same control as that in the first embodiment.

Figure 12:
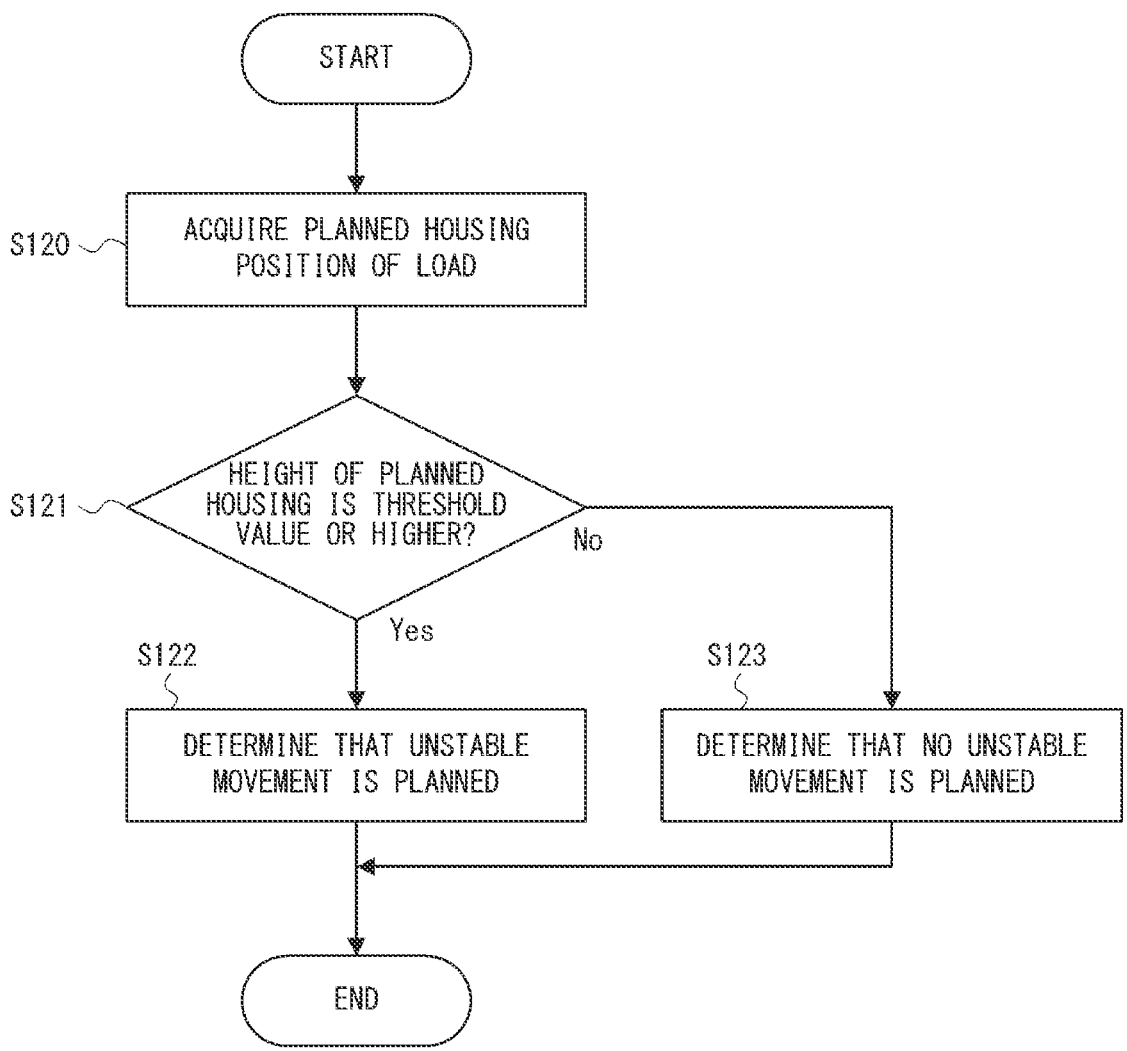
FIG. 12 is a flowchart showing a processing flow of the determination unit according to a third embodiment.

FIG. 12 is a flowchart showing a processing flow of the determination unit 240 according to the third embodiment. That is, FIG. 12 is a flowchart showing a specific processing flow of Step S10 (see FIG. 9) according to the third embodiment. In this embodiment, the processing from Step S120 to Step S123 is performed as the specific processing of Step S10.

First, in Step S120, the determination unit 240 acquires the planned housing position of the load 90 placed on the placement part 130 by the autonomous mobile robot 10.

Next, in Step S121, the determination unit 240 determines whether or not the height of the planned housing position acquired in Step S120 is greater than or equal to the predetermined threshold value. If the height of the planned housing position is greater than or equal to the predetermined threshold value (Yes in Step S121), the determination unit 240 determines in Step S122 that an unstable movement is planned. On the other hand, if the height of the planned housing position is less than the predetermined threshold value (No in Step S121), the determination unit 240 determines in Step S123 that no unstable movement is planned.

The third embodiment has been described above. Also in this embodiment, when an unstable movement of the autonomous mobile robot 10 is planned, the carriage 20 moves toward the autonomous mobile robot 10, so that the risk due to the lowering of the level of the stability of the posture of the autonomous mobile robot 10 is reduced. In particular, in this embodiment, regardless of whether or not the placement part 130 has already been raised, a determination about whether or not the autonomous mobile robot 10 is planned to move toward the carriage 20 in a state in which the load is being raised to the predetermined height or higher by the placement part 130 can be easily made. In this embodiment, the carriage 20 can start moving in order to reduce the risk before the placement part 130 is raised.

The present disclosure is not limited to the above-described embodiments, and may be suitably modified without departing from the scope thereof. For example, some or all of the control processing of the carriage 20 or the autonomous mobile robot 10 may be implemented in a device such as a server. In the above-described embodiments, in order to reduce the risk, it has been explained that the control for moving the carriage 20 is performed so that the autonomous mobile robot 10 is positioned in the chassis 210 of the carriage 20. However, the state in which the autonomous mobile robot 10 is positioned in the chassis 210 of the carriage 20 may not be achieved by the movement of the carriage 20. In this case, with the autonomous mobile robot 10 positioned outside the chassis 210 of the carriage 20, the load 90 may be housed in the carriage 20 by a manipulator or the like provided in the autonomous mobile robot 10. The determination unit 240 may use together the determination methods described in the first to third embodiments.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A control system for controlling a movement of a carriage in which a load is housed, the control system comprising a processor configured to:
- determine whether or not an autonomous mobile robot is planned to move toward the carriage in a state in which the load is raised to a predetermined height or higher by a placement part, the autonomous mobile robot including the placement part having a changeable height and being configured to house the load placed on the placement part in the carriage; and
- control the carriage so that the carriage moves toward the autonomous mobile robot when it is determined that the autonomous mobile robot is planned to move toward the carriage in the state in which the load is raised to the predetermined height or higher by the placement part, wherein:
- the load includes projections projecting in a horizontal direction on both sides of the load,
- the carriage includes an open chassis, the chassis including therein a support part for supporting the projections,
- the processor is configured to move the carriage so that the placement part enters the chassis,
- the carriage further includes a sensor and a mobile device and a pair of rails, the carriage is configured to autonomously move toward the autonomous mobile robot, and that a second state in which the placement part enters the chassis is in which the projections on both sides of the load are positioned above the pair of rails, and
- the processor is further configured to adjust an orientation of the carriage so that a direction in which the pair of rails are extended match a direction in which the projections are extended.

2. The control system according to claim 1, wherein the processor is configured to make the determination based on information indicating a height of the placement part detected by using the sensor or a height of the load above the placement part detected by using the sensor.

3. The control system according to claim 1, wherein the processor is configured to make the determination based on control information about the height of the placement part received from the autonomous mobile robot.

4. The control system according to claim 1, wherein the processor is configured to make the determination based on a planned housing position of the load in the carriage.

5. The control system according to claim 4, wherein the planned housing position is specified from information indicating a position where the load is housed, and the processor is further configured to specify a highest position where the load is housed as the planned housing position.

6. The control system according to claim 1, wherein the chassis is opened to a ground surface or a floor surface.

7. A method for controlling a movement of a carriage in which a load is housed, the method comprising:
- determining whether or not an autonomous mobile robot is planned to move toward the carriage in a state in which the load is raised to a predetermined height or higher by a placement part, the autonomous mobile robot including the placement part having a changeable height and being configured to house the load placed on the placement part in the carriage; and
- controlling the carriage so that the carriage moves toward the autonomous mobile robot when it is determined that the autonomous mobile robot is planned to move toward the carriage in the state in which the load is raised to the predetermined height or higher by the placement part, wherein:
- the load includes projections projecting in a horizontal direction on both sides of the load,
- the carriage includes an open chassis, the chassis including therein a support part for supporting the projections,
- the method further comprising moving the carriage so that the placement part enters the chassis,
- the carriage further including a sensor and a mobile device and a pair of rails, the carriage is configured to autonomously move toward the autonomous mobile robot, and that a second state in which the placement part enters the chassis is in which the projections on both sides of the load are positioned above the pair of rails, and
- the method further comprising adjusting an orientation of the carriage so that a direction in which the pair of rails are extended match a direction in which the projections are extended.

8. A non-transitory computer readable medium storing a program for controlling a movement of a carriage in which a load is housed and the program comprising instructions that, when executed by a processor, cause the processor to execute:
- determining whether or not an autonomous mobile robot is planned to move toward the carriage in a state in which the load is raised to a predetermined height or higher by a placement part, the autonomous mobile robot including the placement part having a changeable height and being configured to house the load placed on the placement part in the carriage; and
- controlling the carriage so that the carriage moves toward the autonomous mobile robot when it is determined that the autonomous mobile robot is planned to move toward the carriage in the state in which the load is raised to the predetermined height or higher by the placement part, wherein:
- the load includes projections projecting in a horizontal direction on both sides of the load,
- the carriage includes an open chassis, the chassis including therein a support part for supporting the projections,
- the instructions further causing the processing to execute moving the carriage so that the placement part enters the chassis,
- the carriage further including a sensor and a mobile device and a pair of rails, the carriage is configured to autonomously move toward the autonomous mobile robot, and that a second state in which the placement part enters the chassis is in which the projections on both sides of the load are positioned above the pair of rails, and
- the instructions further causing the processing to adjust an orientation of the carriage so that a direction in which the pair of rails are extended match a direction in which the projections are extended.

* * * * *